US00RE37162E

(19) United States
(12) Reissued Patent
Roden

(10) Patent Number: US RE37,162 E
(45) Date of Reissued Patent: May 8, 2001

(54) HARD SURFACE CLEANING APPLIANCE

(75) Inventor: Michael J. Roden, Prescott, AZ (US)

(73) Assignee: Professional Chemicals Corporation, Chandler, AZ (US)

(21) Appl. No.: 09/490,492

(22) Filed: Jan. 24, 2000

Related U.S. Patent Documents

Reissue of:
(64) Patent No.: 5,711,051
Issued: Jan. 27, 1998
Appl. No.: 08/626,717
Filed: Apr. 1, 1996

(51) Int. Cl.[7] ..... A47L 11/03; A47L 11/20
(52) U.S. Cl. ..... 15/321; 15/385
(58) Field of Search ..... 15/320, 321, 345, 15/385

(56) References Cited

U.S. PATENT DOCUMENTS

| | | | | |
|---|---|---|---|---|
| 2,220,224 | * | 11/1940 | Faber | 15/385 |
| 3,189,930 | * | 6/1965 | Tuthill | 15/320 |
| 3,719,966 | * | 3/1973 | Lamont | 15/385 |
| 4,037,290 | * | 7/1977 | Rose et al. | 15/345 |
| 4,107,816 | * | 8/1978 | Matthews | 15/320 |
| 4,191,589 | * | 3/1980 | Halls et al. | 134/21 |
| 4,377,018 | * | 3/1983 | Cain | 15/321 X |
| 5,088,151 | * | 2/1992 | Legatt | 15/385 |
| 5,135,015 | * | 8/1992 | Young | 134/179 |
| 5,388,305 | * | 2/1995 | Fields | 15/385 |
| 5,428,863 | * | 7/1995 | Tanasescu et al. | 15/385 X |

* cited by examiner

*Primary Examiner*—Chris K. Moore
(74) *Attorney, Agent, or Firm*—Cahill, Sutton & Thomas P.L.C.

(57) ABSTRACT

A hood with a depending side wall has vacuum passages formed in the inner surface thereof. An inner shroud positioned internally of the hood cooperates therewith in forming the vacuum passages and has a lower edge elevated above the surface to be cleaned. A foramenous skirt depends from the lower edge of the hood sidewall to contact the surface to be cleaned. The vacuum passages are connected to a source of vacuum. A rotating spray assembly inside the shroud sprays cleaning liquid onto the surface to be cleaned.

9 Claims, 1 Drawing Sheet

HARD SURFACE CLEANING APPLIANCE

Matter enclosed in heavy brackets [ ] appears in the original patent but forms no part of this reissue specification; matter printed in italics indicates the additions made by reissue.

TECHNICAL FIELD

This invention is concerned with the removal from a hard surface, such as cement, of soils, such as gum, soda pop, candy and other foods and oil and grease drippings from motor vehicles.

BACKGROUND ART

Governmental regulations enacted in recent years concerning the disposal of hazardous materials prohibit removing surface soils by scrubbing the surface and flushing the removed soil down a drain with water. The soil that is removed must be collected and transported to an approved disposal facility.

Appliances have been devised which reportedly were capable of cleaning hard surfaces. U.S. Pat. No. 3,189,930 granted Jun. 22, 1925 to H. G. Tuthill, Jr. for "Surface Cleaning Apparatus" discloses such an appliance. However, because Tuthill relied primarily oft rotating brush action to loosen soil, his appliance was more suited for carpet cleaning than removing hard-to-remove stains from concrete.

Carl R. Young in his U.S. Pat. No. 5,135,015 granted Aug. 4, 1992 for "Pressurized Fluid Cleaning Device" recognized the capability of high pressure liquid spray from a rotating nozzle assembly to loosen soil and debris. Young's appliance does not comply with current regulations because in cannot retrieve the loosened soil.

U.S. Pat. Nos. 4,191,589 granted Mar. 4, 1980 to K. F. Halls et al for "Method and Apparatus for Cleaning Carpets and Surfaces Using Cleaning Fluid" and 4,377,018 granted Mar. 22, 1983 to G. E. Cain for "Cleaning Devices for Surfaces" combine serf propelling rotatable spray nozzle assemblies with adjoining vacuum nozzles for removing the soil. The disposition of the vacuum nozzle in these appliances limits their effectiveness and versatility. For example, in use the Halls et al appliance must be drawn rearwardly in a straight line. And the vacuum hood of the Cain appliance likely gave uneven performance across its width.

The inventors identified in two prior patents sought to improve the vacuum withdrawal of soil by providing bell-shaped vacuum hoods with flexible sealing skirts at their lower peripheries. Their patents are U.S. Pat. No. 4,037,290 granted Jul. 26, 1977 to J. J. Rose et al for "Vacuum Cleaning Device" and U.S. Pat. No. 4,107,816 granted Aug. 22, 1978 to P. W. Matthews for "Cleaning Heads". Both inventors preferred to provide a motor for rotating spray nozzles in the hoods. Rose et al employed an air jet nozzle while Matthews chose to spray cleaning water. Neither of these two appliances offers a particularly effective vacuum soil removing system.

There continues to be a need for a hard surface cleaning appliance which effectively loosens soil from the surface and removes and captures the soil and spent cleaning fluid.

DISCLOSURE OF THE INVENTION

This invention significantly improves the capability of the cleaning appliance to remove substantially all of the loosened soil and cleaning fluid from the surface, thus reducing runoff of possibly hazardous materials.

The improvement resides primarily in the construction of the hood covering the cleaning area and associated components. The hood has a depending wall in which vacuum passage means are formed. The bottom edge region of the hood wall carries a foramenous skirt which is adapted to contact the surface being cleaned.

Positioned inside the hood is an inner shroud which cooperates with the hood in forming the vacuum passages. The lower edge of the shroud is elevated slightly above the surface to be cleaned to permit cleaning fluid and soil to be drawn outwardly beneath the lower edge of the shroud into the vacuum passages. At the same time the foramenous skirt permits a quantity of air to be drawn through the skirt into the vacuum passage thereby precluding cleaning fluid and soil from passing outwardly through or beneath the skirt and providing a moving air stream to carry the cleaning fluid and soil through the appliance and away from the surface.

The vacuum passage means preferably includes a plurality of substantially upright passages in the hood. One-half of the upright passages are in communication with one semi-circular manifold passage and the other haft of the upright passages are in communication with a second semi-circular manifold passage.

BRIEF DESCRIPTION OF THE DRAWINGS

The invention is described in greater detail hereinafter by reference to the accompanying drawings wherein.

BEST MODE FOR CARRYING OUT THE INVENTION

Figure 1:
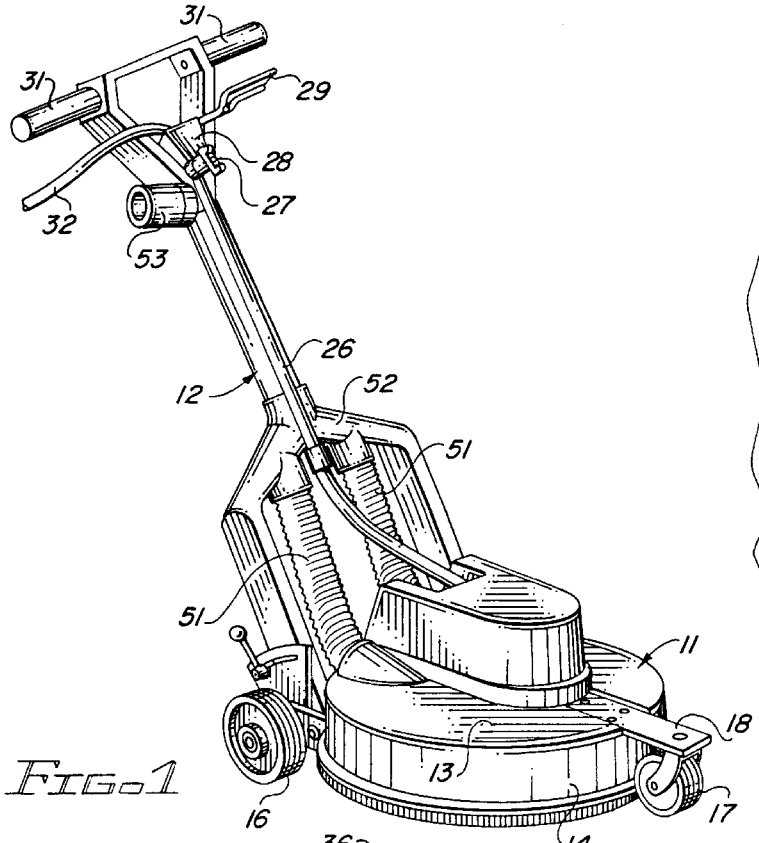
FIG. 1 is a perspective view of a hard surface cleaning appliance incorporating the invention.

The appliance of this invention as illustrated in FIG. 1 comprises a cleaning head 11 which is manipulated by an operator by means of a handle 12. Cleaning head 11 includes a dome-shaped hood 13 having a substantially cylindrical, depending side wall 14.

The cleaning head 11 preferably is equipped with a pair of rear mounted wheels 16 onto which the head can be tilted up and back for moving the appliance around when not actually in use. The head 11 may also have a caster mounted front wheel 17 carried on a leaf spring for supporting a portion of the weight of the head 11 during use.

Figure 2:
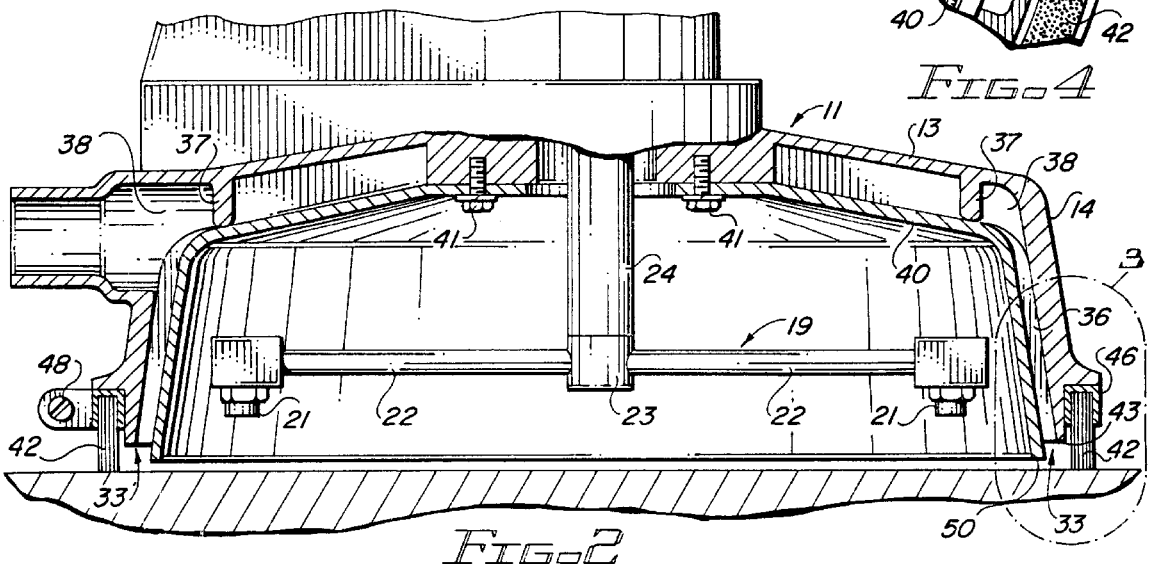
FIG. 2 is a vertical sectional view through the surface contacting portion of the appliance.

The basic function of the cleaning head 11 is to confine and remove from the surface to be cleaned spent cleaning fluid and loosened soil. The cleaning fluid is delivered to that surface by means of a rotatable spray assembly indicated generally by reference numeral 19 in FIG. 2.

Spray assembly 19 includes a pair of spray nozzles 21 carried at the ends of hollow arms 22 extending outwardly from a manifold rotatably mounted on a fluid delivery post 24.

Fluid delivery post 24 is connected to cleaning fluid supply line 26 extending up handle 12 to a manually adjustable metering valve 27 and an on/off control valve 28.

On/off control valve 28 is manipulated by the operator by a hand lever 29 near one of the handgrips 31 on handle 12.

Pressurized cleaning fluid, which may simply be heated or unheated water or a solution of water and a cleaning agent, is delivered to on/off valve 28 by a flexible hose 32 connected to a source (not shown) of that fluid.

Spray nozzles 21 are mounted on arms 22 at an angle to the vertical so that the reaction from the high speed jet of cleaning fluid issuing from the nozzles causes the spray assembly to rotate. This assures that the entire surface area under the head 11 receives a high pressure spray of cleaning fluid.

As mentioned previously, a critical performance characteristic of this type of cleaning appliance is that it effectively removes and collects from the cleaning surface the cleaning fluid deposited on the surface and the soil loosened from the surface. Vacuum passage means in the hood 13 is designed to effectively perform this task.

The vacuum passage means is illustrated in FIGS. 2 through 5 and is designated generally by reference numeral 33.

The vacuum passage means 33 can be perceived as being formed in the inner surface of the dome-shaped hood 13. The inner surface of depending side wall 14 of the hood 13 has a plurality of upwardly extending ribs 34 formed thereon which separate a plurality of similarly shaped upright passages 36. The inside surface of the top wall of the hood 13 is provided with a pair of semi-circular descending ribs 37 which form two semi-circular vacuum manifold passages 38. One of the semi-circular manifold passages 38 is in communication with one-half of the upright passages 36. The other semi-circular manifold passage 38 is in communication with the other half of the upright passages 36.

Cooperating with the hood 13 in the formation of vacuum passages 36 and 38 is an inner shroud 40. Shroud 40 is also dome-shaped and sized to fit tightly against ribs 34 and 37 on the inner surface of the hood. Suitable fasteners, such as bolts 41 can be used to hold the shroud 40 in the hood 13.

The vacuum passage means 33 through the hood 13 also includes a foramenous, depending annular skin 42 mounted on the outer surface of the lower end 43 of hood wall 14. Foramenous skirt 42 is designed to contact the surface being cleaned and to support at least a portion of the weight of the appliance. Skirt 42 has, in addition, the functions of preventing the escape of cleaning fluid and soil from the appliance and admitting air to be drawn therethrough into the vacuum passages 36 and 38.

Although skin 42 may be formed of a variety of foramenous materials it is preferable constructed like an annular brush with a mass of closely packed fibers 44 carried in a split annular mounting ring 46. Mounting ring 46 preferably abuts a retainer flange 47 on the outer surface of hood sidewall 14 and is held in place by means of a tab and screw tightening device 48 located at the split in the mounting ring.

Figure 3:
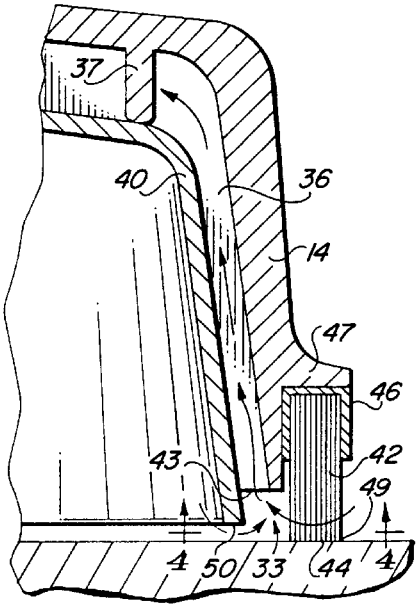
FIG. 3 is an enlarged sectional view of a portion of the appliance in the region included in the encircled region 3 of FIG. 2.
Figure 5:
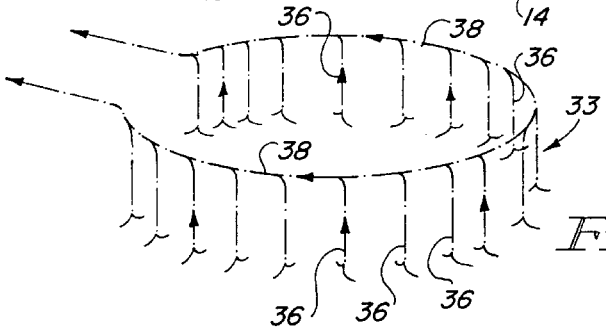
FIG. 5 is a diagrammatic illustration of the air flow pattern through the appliance.
Figure 4:
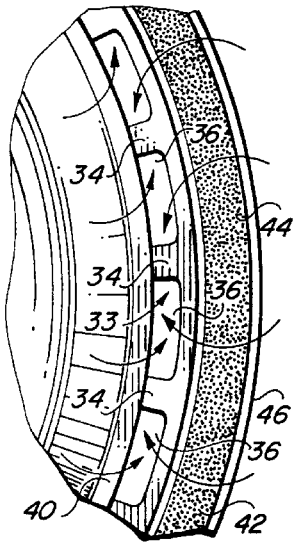
FIG. 4 is a horizontal sectional view taken from below as indicated by line 4—4 of FIG. 3.

For best operating results, i.e. best soil and cleaning fluid removal, there is a preferred relationship between the positions of the surface contacting lower edge 49 of skin 42, the lower edge 43 of hood wall 14 and the lower edge 50 of shroud 40. The preferred relationship is best illustrated in FIG. 3 of the drawing. In this relationship the lower edge 50 of shroud 40 is elevated a slight distance above the surface being cleaned while the lower edge 43 of hood wall 14 is elevated a slightly greater distance above the surface being cleaned. Liquid and soil drawn beneath the lower edge 50 of shroud 40 is swept up in the rapidly moving air stream flowing through skin 42 and into the upright passages 36 and into the two manifold vacuum passages 38.

The mixture of air, cleaning fluid and soil is drawn out of the vacuum passage manifolds 38 through two flexible hoses 51 into hollow handle manifold 52, up through the handle 12 to a connector 53 to which a flexible hose connects with a source of vacuum (not shown). The dual manifold vacuum passages 38 in the hood 13 insure that all of the upright vacuum passages 36 are adequately and evenly serviced to withdraw spent cleaning fluid and soil.

From the foregoing it should be apparent that this invention provides a more effective and reliable hard surface cleaning appliance.

What is claimed is:

1. A hard surface cleaning appliance comprising a hood having a depending sidewall terminating with a lower edge, [vacuum passage means formed in the inner surface of the hood,] an inner shroud positioned internally of said hood and having a lower edge spaced inwardly of the lower edge of said hood sidewall, *said hood and said inner shroud forming vacuum passage means therebetween,* a foraminous skirt depending from the lower edge of the hood sidewall, said skirt being adapted to contact the surface to be cleaned, the lower edge of said shroud being elevated above the surface to be cleaned and the lower edge of the sidewall of said hood also being elevated above the surface to be cleaned and means for creating a vacuum in the vacuum passage means [in the hood].

2. The appliance of claim 1 including means inside said shroud for spraying cleaning liquid onto the surface to be cleaned.

3. The appliance of claim 1 wherein said vacuum passage means includes a plurality of upright passages spaces around the sidewall of the hood and two vacuum manifold passages each communicating with different substantially one-halfs of the number of upright passages.

4. The appliance of claim 3 wherein said inner shroud cooperates with said hood in providing said vacuum passage means.

5. The appliance of claim 1 wherein the lower edge of the sidewall of said hood is elevated above the surface to be cleaned a greater distance than the lower edge of said shroud is elevated above that surface.

6. The appliance of claim 5 including means inside said shroud for spraying cleaning liquid onto the surface to be cleaned.

7. The appliance of claim 6 wherein said skirt is a fibrous brush.

8. The appliance of claim 5 wherein said vacuum passage means includes a plurality of upright passages spaced around the sidewall of the hood and two vacuum manifold passages communicate with different substantially one-half of the upright passages.

[9. The appliance of claim 5 wherein said inner shroud cooperates with said hood in providing said vacuum passage means.]

10. The appliance of claim 5 wherein said skirt is a fibrous brush.

* * * * *

Disclaimer

RE. 37,162 E—Michael J. Roden, Prescott, AZ. HARD SURFACE CLEANING APPLIANCE. Patent dated May 18, 2001. Disclaimer filed March 31, 2004, by the assignee Professional Chemicals Corporation.

Hereby enters this disclaimer to claims 1-10 of said patent.

*(Official Gazette March 15, 2005)*